Sept. 4, 1956 C. H. COWLEY ET AL 2,761,248
APPARATUS FOR FUSING SPACED SHEETS OF GLASS
Filed July 25, 1952 5 Sheets-Sheet 1

Inventors
Charles H. Cowley
and John A. Woods
By Nobbe & Swope
Attorneys

Sept. 4, 1956     C. H. COWLEY ET AL     2,761,248
APPARATUS FOR FUSING SPACED SHEETS OF GLASS
Filed July 25, 1952     5 Sheets-Sheet 2
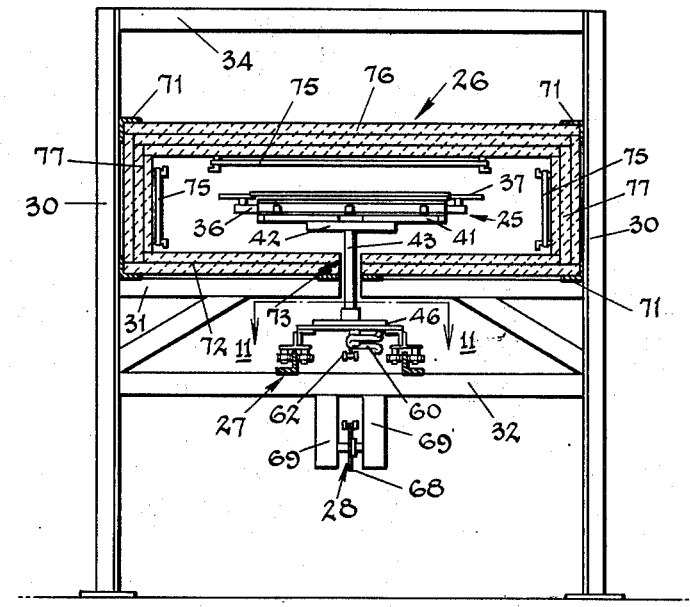
Fig. 6
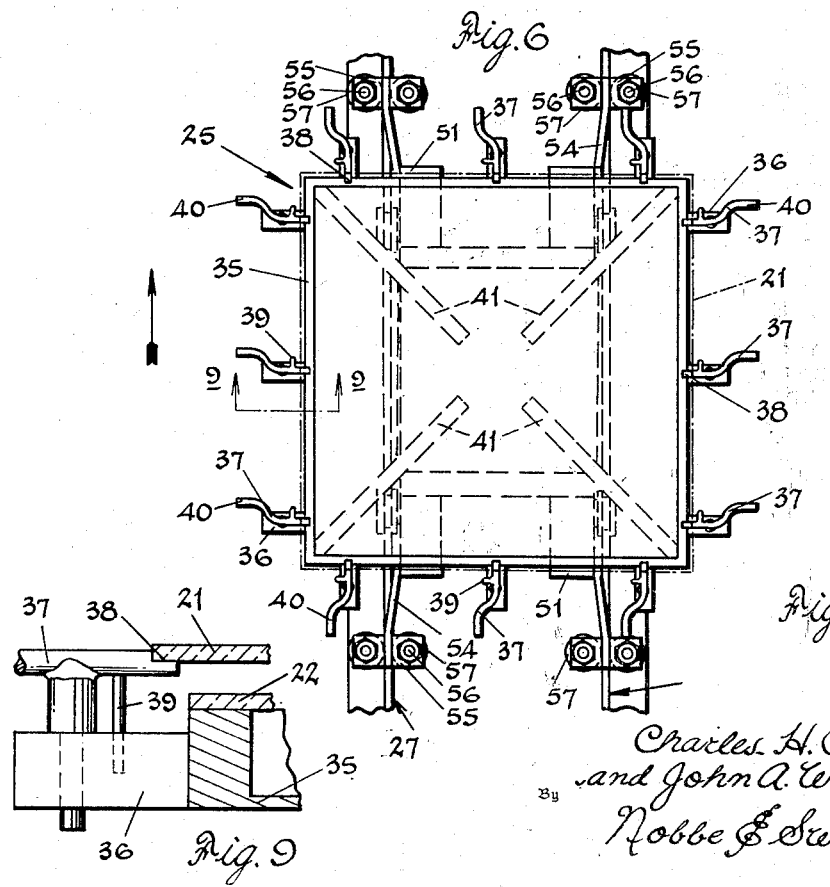
Fig. 8
Fig. 9
Inventors
Charles H. Cowley
and John A. Woods
By Nobbe & Swope
Attorneys Sept. 4, 1956 C. H. COWLEY ET AL 2,761,248
APPARATUS FOR FUSING SPACED SHEETS OF GLASS
Filed July 25, 1952 5 Sheets-Sheet 3
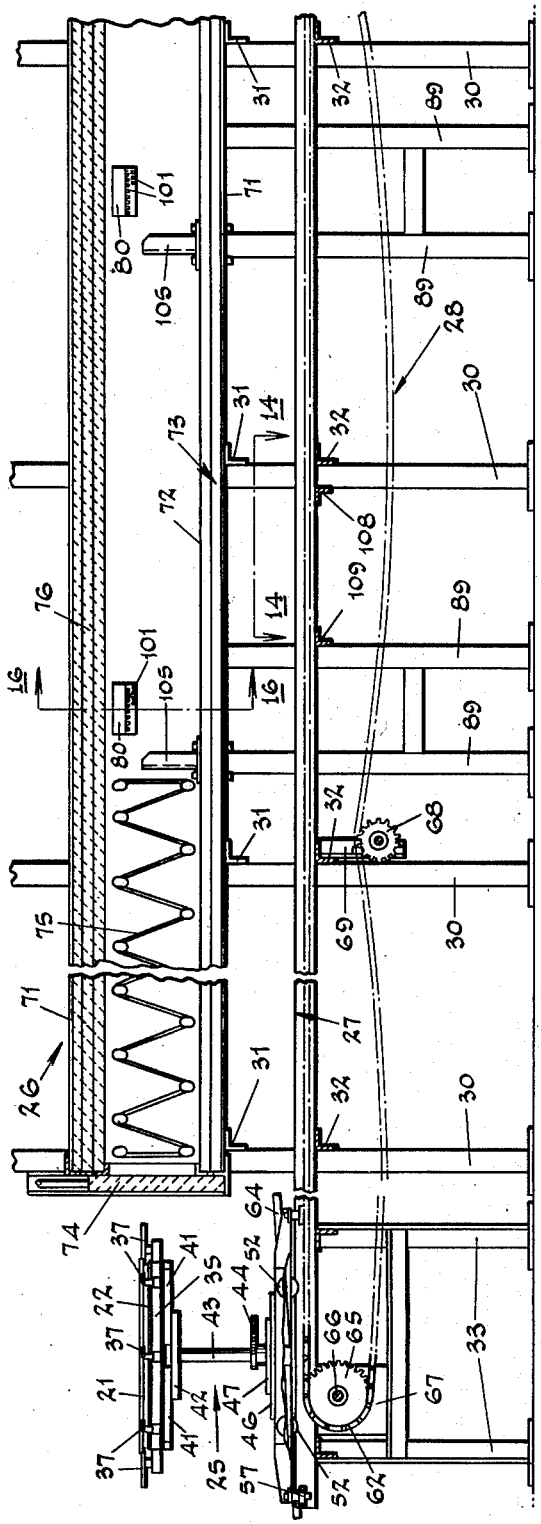
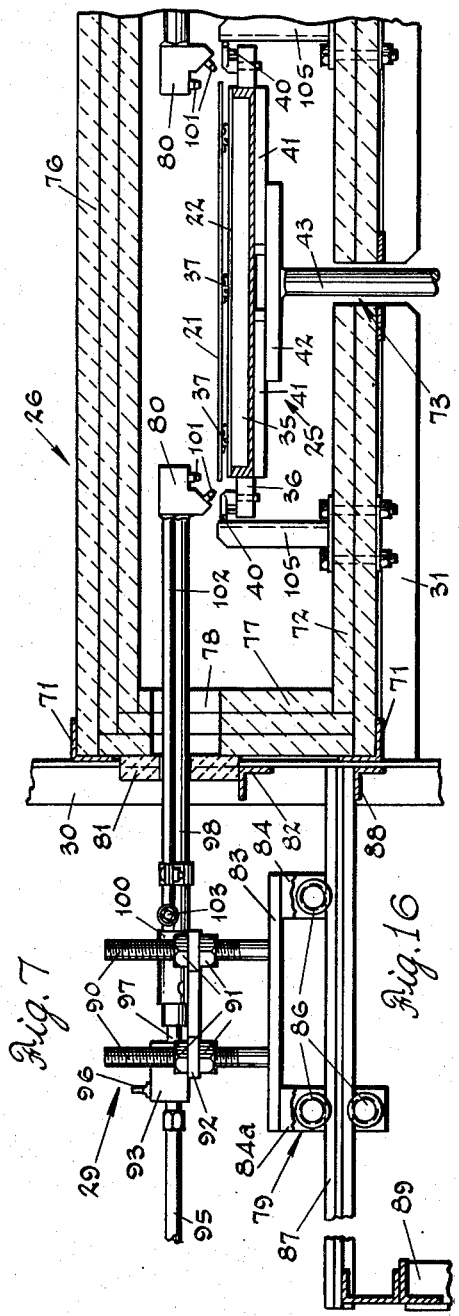
Inventors
Charles H. Cowley
and John A. Woods
By Nobbe & Swope
Attorneys Sept. 4, 1956  C. H. COWLEY ET AL  2,761,248
APPARATUS FOR FUSING SPACED SHEETS OF GLASS
Filed July 25, 1952  5 Sheets-Sheet 4

Inventors
Charles H. Cowley
and John A. Woods
By Nobbe & Swope
Attorneys

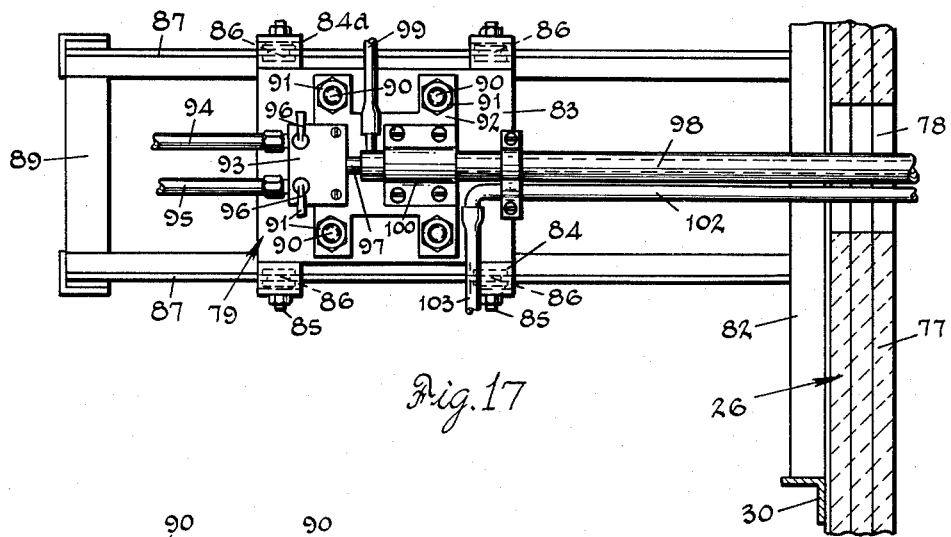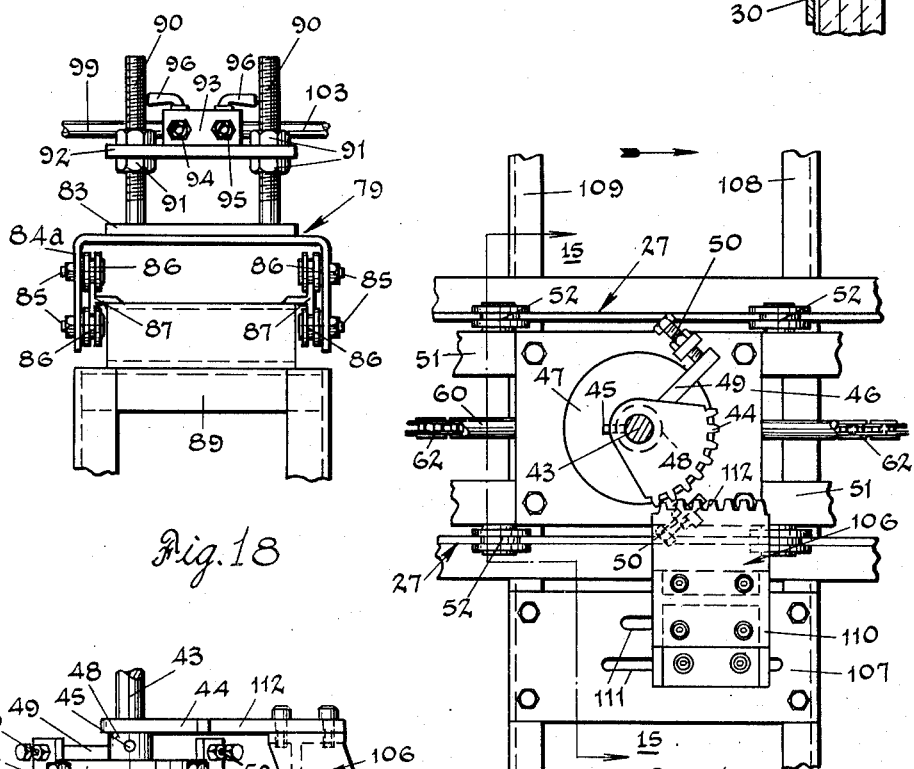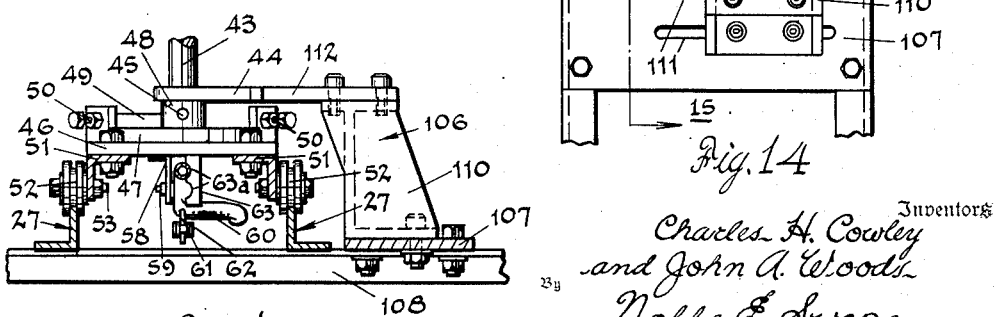

United States Patent Office 2,761,248
Patented Sept. 4, 1956

2,761,248

APPARATUS FOR FUSING SPACED SHEETS OF GLASS

Charles H. Cowley and John A. Woods, Toledo, Ohio, assignors to Libbey-Owens-Ford Glass Company, Toledo, Ohio, a corporation of Ohio Application July 25, 1952, Serial No. 300,932

8 Claims. (Cl. 49—1)

This invention relates broadly to spaced hermetically sealed units and, more particularly, to the forming of marginally sealed, all glass multiple sheet glazing units. To be even more specific, it relates to an apparatus by which, for example, sheets of plate or window glass may be fused in spaced face-to-face relation entirely around their marginal edges while continuously moving in a straight path.

An object of this invention is to provide an apparatus by which spaced sheets of glass may be fused entirely around their marginal edges during continuous movement thereof in a straight path.

Another object of this invention is to provide an improved apparatus for forming all glass, multiple sheet glazing units by means of which the sheets are moved in spaced relation past gas burners to fuse the marginal edges thereof.

Still another object of this invention is to provide improved apparatus by means of which the edges of one sheet of glass may be supported in spaced face-to-face relation above those of another and the supports therefor progressively removed just prior to the fusing of said edges such that the proper spacing may be maintained at all times during the fusing.

Still another object of this invention is to provide an apparatus for sealing spaced sheets of glass entirely around the marginal edges thereof by means of which the marginal edges of first one and then the other pair of opposite sides of the sheets may be fused while said sheets are continuously moving in a straight path.

Still another object of this invention is to provide apparatus for indexing or turning spaced sheets of glass as they are continuously moving in a straight path such that the marginal edges thereof may be fused entirely therearound.

Other objects and advantages of the invention will become more apparent during the course of the following description when taken in connection with the accompanying drawings.

The inventive features described and claimed in this application are intended to be used in practicing the method of producing the article described and claimed in an application of Donald E. Sharp, Alfred E. Badger and John A. Woods, Serial No. 300,884, filed July 25, 1952.

By means of the apparatus of this invention, sheets of glass may be moved in spaced face-to-face relation past and in close proximity to gas burners such that all of the edges of the respective sheets may be brought to a melting point and permitted to fuse together during said movement thereof in a single, straight path. That is, the sheets may be continuously moved in a straight path through a furnace such that the marginal edges of opposite sides of the respective sheets may be simultaneously fused, while being maintained in said spaced relation, by burners directed toward said edges.

In accordance with this invention and to attain the objects aforenoted, there is provided in combination with an apparatus for continuously moving spaced sheets of glass in a straight path through a furnace: improved means for supporting an upper sheet in fixed spaced face-to-face relation with respect to a lower sheet, improved means for removing said support just prior to the time at which the edges of said sheets are moved past and almost instantaneously fused together by gas burners movable into operative relation therewith, and means for indexing or turning the sheets while so spaced such that all of the edges thereof may be moved past the burners during the aforesaid continuous movement in a straight path.

In the drawings wherein like numerals are employed to designate like parts throughout the same;

Fig. 6 is a transverse sectional view of the apparatus taken substantially along broken line 6—6 of Fig. 4 showing the sheet supporting carriage in the preheating area of the furnace;

Fig. 7 is a fragmentary longitudinal sectional view of the apparatus taken substantially along broken line 7—7 of Fig. 5;

Fig. 8 is a top plan view of the carriage in its initial position with the sheets supported thereon;

Fig. 9 is an enlarged fragmentary transverse sectional view of the carriage tray taken substantially along broken line 9—9 of Fig. 8;

Fig. 14 is a top plan view similar to that of Fig. 11 of the lower portion of the carriage but also showing the indexing device and taken substantially along broken line 14—14 of Fig. 7;

Fig. 15 is a fragmentary transverse sectional view of the carriage and indexing device taken substantially along broken line 15—15 of Fig. 14;

Fig. 16 is a fragmentary sectional view of the apparatus taken substantially along broken line 16—16 of Fig. 7;

Fig. 17 is a top plan view of one of the adjustable burners; and

Fig. 18 is a fragmentary side elevation of the burner of Fig. 17 as viewed from the left thereof.

Figure 1:
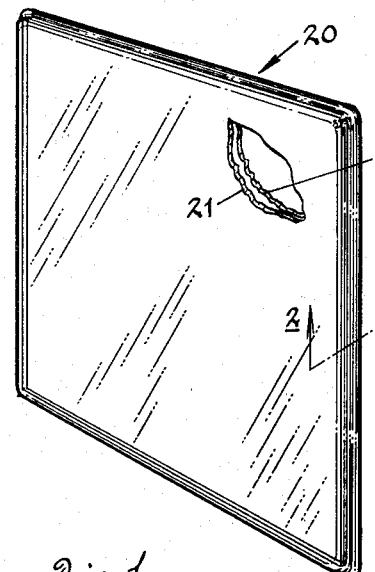
Fig. 1 is a perspective view of the double glazed unit formed by the disclosed apparatus, with a portion of the unit broken away.
Figure 2:
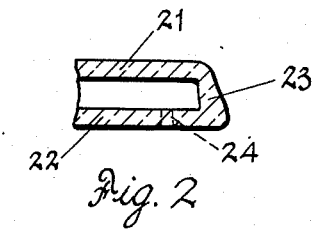
Fig. 2 is a fragmentary sectional view of the unit taken substantially along broken line 2—2.
Figure 3:
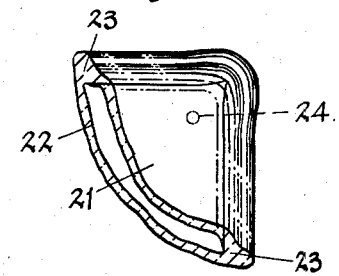
Fig. 3 is a fragmentary top plan view of a corner of the unit.

Referring now more particularly to the drawings, there is shown in Fig. 1 a marginally sealed glazing unit 20 which may be formed by the apparatus disclosed herein. As best illustrated in Figs. 2 and 3, this unit consists of upper and lower sheets or plates of glass 21 and 22, respectively, and side portions 23 where the marginal edges of the upper sheet have sagged downwardly and those of the lower sheet have curled upwardly so as to fuse with one another upon the application of heat in a manner to be described. Upper sheet 21 before fusing is slightly larger in area than lower sheet 22 (Fig. 16) such that the marginal edges of said upper sheet may sag downwardly to form the greater portion of side portion 23 as noted above. However, after fusing and as a part of the sealed unit 20, upper sheet 21 is slightly smaller than lower sheet 22. Portions 23 are relatively thicker adjacent said lower sheet than at their juncture with said upper sheet inasmuch, of course, as the fusion of the upper and lower marginal edges occurs closer to the lower sheet than to the upper. A dehydrating hole 24 is provided in the lower sheet for a purpose well known in the hermetically sealed, multiple sheet glazing art, and to be mentioned hereinafter.

Figure 4:
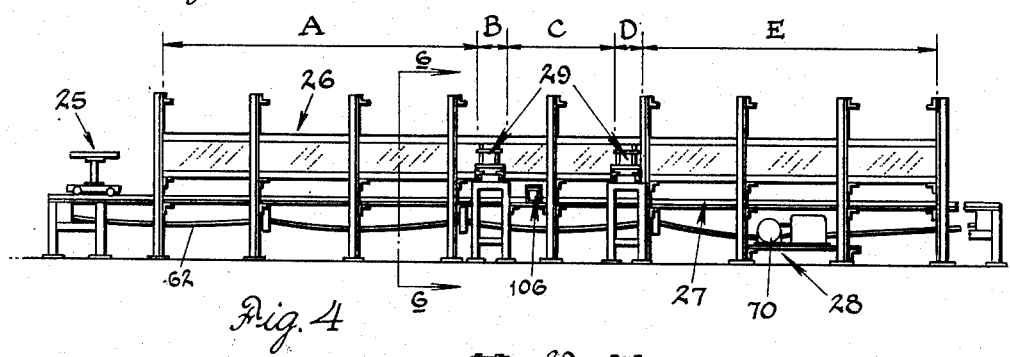
Fig. 4 is a side elevation of the entire apparatus for forming the units of Figs. 1 to 3.
Figure 5:
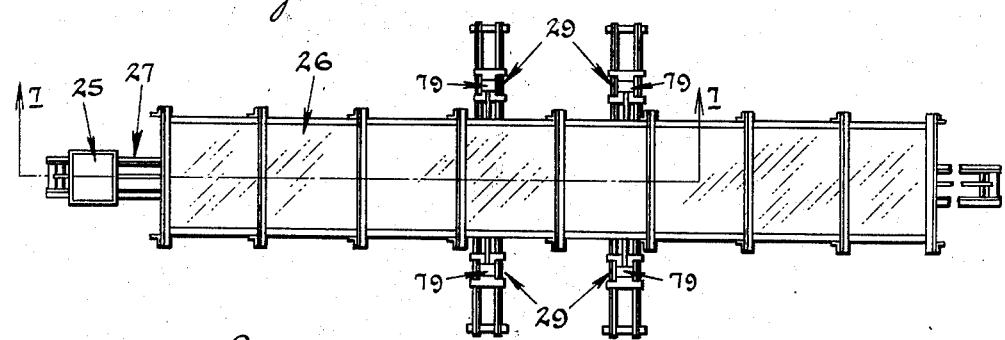
Fig. 5 is a top plan view of the apparatus.
Figure 11:
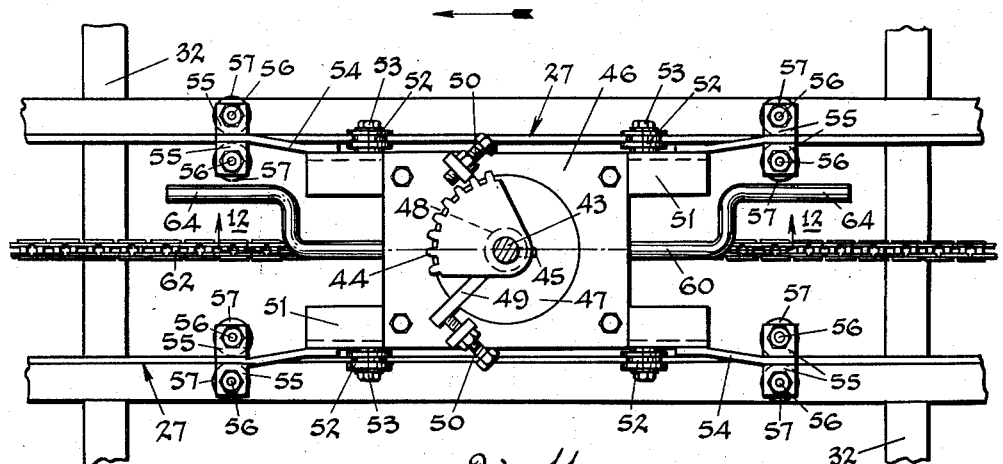
Fig. 11 is a top plan view of the lower portion of the carriage taken substantially along broken line 11—11 of Fig. 6.

The entire apparatus for producing the above-described article shown in Figs. 4 and 5, comprises a carriage 25 for supporting the sheets in spaced relation, a furnace 26 through which the sheets and the upper portion of the carriage are moved forwardly from left to right, rails 27 for guiding and supporting the carriage, conveyor means 28 for moving the carriage and sheets on the rails through the furnace, and adjustable burners 29 for sealing the marginal edges of the sheets as they are so moved. Arranged within the furnace, in order of use and moving from left to right in the figures, are a preheating area A, a first sealing area B adjacent a first set of burners, an indexing area C, a second sealing area D adjacent a second set of burners, and an annealing area E.

Both the furnace 26 and the rails 27 are disposed between upstanding frame members 30 spaced longitudinally thereof for substantially the length of said furnace. Horizontal frame members 31 extend laterally between said upstanding members to support the furnace at a point suitably elevated from said rails, which are supported by similar horizontal frame members 32 also extending laterally between said upstanding frame members as well as between shorter vertical frame members 33 at each end of the furnace, such that the upper portion of carriage 25 supporting sheets 21 and 22 may be moved through said furnace in proper relationship with respect to burners 29. Additional horizontal frame members 34 (Fig. 6) are provided above the furnace and at the upper end of said upstanding frame members to add rigidity to the superstructure.

Figure 10:
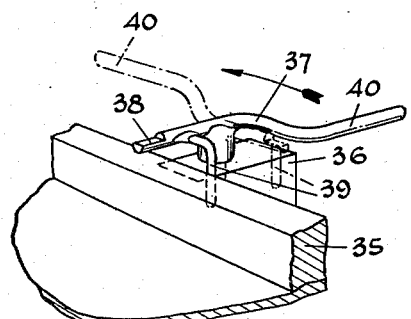
Fig. 10 is a detailed perspective view of an upper sheet supporting arm of the tray.
Figure 13:
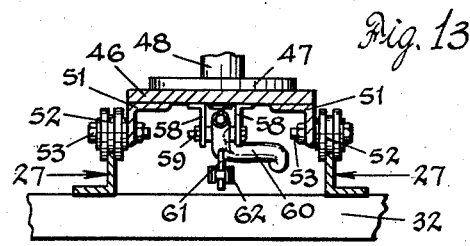
Fig. 13 is a fragmentary transverse sectional view of the lower part of the carriage taken substantially along broken line 13—13 of Fig. 12.

Dealing now with carriage 25, a shallow tray 35 conforms to the edges of lower sheet 22 and is adapted to support said sheet by engagement at its outer rim with said edges. Flanges 36 extend outwardly from the sides of the tray and provide journal openings for mounting substantially T shaped arms 37 in upstanding relation therefrom. These arms are rotatably movable in said openings in the plane of lower sheet 22 and are adapted, in one position, to support upper sheet 21 in fixed, spaced vertical relation with respect to said lower sheet. Glass contacting ledges 38 are formed from notches in the inner ends of said arms to support the upper sheet in a fixed vertical position as well as to prevent its movement horizontally, such that said upper sheet is rigidly located substantially coaxially with respect to lower sheet 22 with its edges substantially parallel to and extending beyond those of the lower sheet a distance sufficient to form side portion 23 as the sheets are fused. That is, the amount of overlap is dependent upon the desired spacing of the sheets or the amount of sag of the edges of the upper sheet necessary to bridge the space between said sheets in fusing with curled edges of the lower sheet. Inverted L shaped stop members 39 depend from each of the arms 37 so as to abut against flange 36 in alternate positions when said arms are in either the glass supporting position or a "knocked-out" non-supporting position, as shown by the broken lines of Fig. 10. The arms are bent longitudinally to form at their outwardly disposed ends handle portions 40 which extend beyond flanges 36 for a purpose to be described subsequently.

Beneath tray 35 are reinforcements 41 supported by a flat plate 42. Said plate is secured to and supported by the upper end of king pin 43 which in turn is slidably received toward its opposite lower end in a central opening of sector gear 44 and fixedly elevated therefrom and secured thereto by a set screw 45. A portion of the king pin extends below the sector gear and is journaled in an opening centrally of a carriage base member 46 on the top of which the circular base 47 of the sector gear is supported. Extending outwardly from the hub 48 of said gear is an arm 49 which serves in alternate position as a stop member therefor as king pin 43 rotates within the journal opening of carriage base member 46, and tray 35 and sheets 21 and 22 supported thereon are indexed or swung correspondingly, in a manner to be subsequently described. The alternate position of arm 49 as well as the tray and sheets supported thereon are defined by limit screws 50 mounted on the upper surface of the carriage base member as the opposite faces of said arm abut alternately against each of the limit screws.

Secured to the bottom of carriage base member 46 at each longitudinal side thereof are angle irons 51, the vertical legs of which are flush with the edges of said sides. Said angle irons extend beyond the ends of base member 46 to accommodate grooved wheels 52 which are pivotally mounted with respect to and spaced slightly from the vertical legs thereof by means of rods 53 extending horizontally from said legs, and are adapted to ride over rails 27 which are supported as previously noted. By means of the interfitting relationship of the wheels and rails, the carriage is guidably retained in its path longitudinally through furnace 26.

Figure 12:
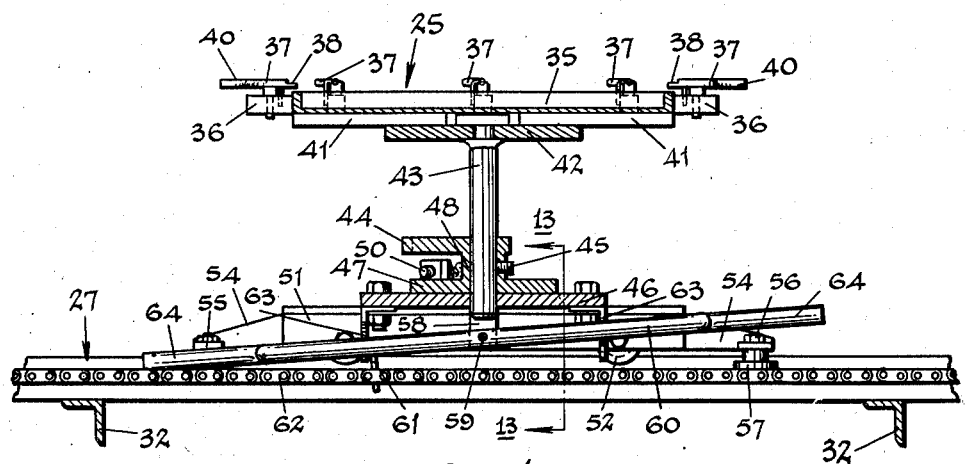
Fig. 12 is a longitudinal sectional view of the entire carriage taken substantially along broken line 12—12 of Fig. 11.

Arms 54 are secured at one end to the vertical legs of angle irons 51 outwardly of wheels 52 and are bent longitudinally such that their opposite ends are vertically aligned with rails 27. The lower edges of the arms are horizontally aligned with the lower edges of said vertical legs and spaced slightly vertically from the top edges of the rails (Fig. 12). Extending from both sides of said opposite ends of arms 54 are ears 55 from which depend pins 56 for supporting horizontal rollers 57. The rollers ride on both sides of rails 27 slightly beneath the upper edges of said rails, thereby adding further stability against tipping of the carriage.

Secured to the bottom of carriage base member 46 parallel to angle irons 51 and at opposite sides of king pin 43 are inverted L-shaped support members 58 through the vertical legs of which is journaled a pin 59. A longitudinally bent rod 60 is swingably supported at its midportion by pin 59 between said support members 58. A key 61 depends from a portion of rod 60 at one side of pin 59 so as to engage with a link chain 62 of the conveyor means 28 when said rod is tilted in the direction of said key, as shown, for example, in Fig. 12. Of course when the rod is tilted in the opposite direction, the key will be disengaged from the chain. Locking member 63 depends from and is supported by the carriage base member in substantial alignment with rod 60 so as to retain said rod in either the engaged or disengaged position by means of groove portions 63a in the vertical legs of said locking member. That is, as the rod is swung on pin 59, it snaps into either of the aforementioned positions by a simple manipulation of handle portions 64 at the ends of said rod.

With particular reference to the conveyor means 28, the upper run of link chain 62 is disposed between rails 27 and is elevated above the horizontal frame members 32 such that it will be engaged by key 61 of the carriage as rod 60 is swung into the engaging position. Said upper run is tautly supported adjacent each end of the rails by sprockets 65 (Fig. 7) which are rotatably mounted on a cross rod 66 extending transversely between panels 67. The slack lower run of the chain is supported at a number of places longitudinally thereof by smaller sprockets 68 suspended below horizontal frame members 32 by vertical supports 69 secured to said frame members. Any suitable power means 70 (Fig. 4) may be provided for driving the chain such that the upper run thereof will travel forwardly from left to right.

The furnace 26 comprises a continuous, open-ended chamber made up of top, bottom and side walls of any suitable refractory material. As previously mentioned, it is supported by horizontal frame members 31 at a proper elevation with respect to the rails 27 and burners 29. Angles 71 run the full length of the furnace at each corner edge thereof with their vertical legs adjacent upstanding frame members 30 so as to space the side walls of the furnace slightly therefrom. The horizontal legs of the lower pair of angles rest upon said horizontal frame members 31 and space the bottom wall of the furnace slightly therefrom.

Extending longitudinally of the full length of the bottom wall 72 and through horizontal frame members 31 is an opening 73 wide enough to permit free passage for king pin 43 therethrough as the carriage moves through the furnace. At each open end of the furnace there is a gate 74 (Fig. 7) of similar refractory material and vertically slidable over its respective open end. Thus, the gates may be readily opened and closed by any suitable means as carriage 25 enters and leaves the furnace.

Electric resistant elements 75 are suitably arranged in the preheating area A over the inside of the top wall 76 and side walls 77 of the furnace. Slotted opening 78, large enough to permit the free passage therethrough of the heads of burners 29 in a manner to be described, are provided through the side walls in the sealing areas B and D, as previously mentioned.

Burners 29, adjacent each of the sealing areas and disposed at each side thereof, are vertically adjustable with respect to and supported by carriages 79, which are movable toward and away from the furnace at the areas above mentioned, such that burner heads 80 can be moved through their respective openings 78 and into operative relation (Fig. 16) with the glass sheets as said sheets move through the furnace. Removable shields 81 supportable on a ledge 82 may be provided to close the openings as shown.

Secured to each end of the bottom of the burner carriage base members 83 are inverted inner and outer U-shaped members 84 and 84a, respectively (Fig. 18). Rotatably mounted on rods 85 extending inwardly from each of the U-shaped members are grooved wheels 86. The depending legs of the outer members 84a are substantially longer than those of the inner member 84 so as to accommodate two of such wheels at each leg thereof, as best shown in Figs. 16 and 18. Thus, the burner carriages are guidably moved over horizontal interfitting T rails 87 and are prevented from tipping forwardly, under the influence of the weight of the burner heads 80, by the engagement of the rear wheels of the carriage at both the upper and lower edges of the T rails.

The horizontal T rails 87 are supported laterally at one end on a ledge 88 (Fig. 16) secured to upstanding frame members 30 and at the other end by inverted U-shaped supports 89. Said rails are of a length sufficient to permit the burner carriage 79 to be moved outwardly thereover and burner heads 80 to be removed from the inside of the furnace through openings 78.

Upstanding from the top surface of each of the burner carriage base members 83 are threaded posts 90 from which is elevated, by means of adjusting nuts 91, a platform 92 in parallel relation to said base member, such that the height of the burner head 80 may be adjusted vertically with respect to the glass sheets, as can be readily understood in connection with Fig. 16.

Secured to the upper surface of the platform is a mixing chamber 93 to which oxygen and gas are supplied by pipes 94 and 95 from available sources (not shown). The chamber is provided with suitable valves 96 for controlling the mixture of gases as well as an outlet pipe 97 therefor which is concentrically arranged within and spaced from the entire length of an enlarged cooling conduit 98. Projecting outwardly from the side of the cooling conduit adjacent the end of the outlet pipe 97 at the mixing chamber is a nipple to which may be attached a hose 99 for supplying water or other suitable cooling medium to the inside of the cooling conduit such that said medium will surround the outlet pipe as the gas mixture is fed therethrough from the mixing chamber to the burner head 80. Said cooling conduit is rigidly retained in position on platform 92 by means of a bracket 100 secured to said platform.

The gas mixture is fed by the outlet pipe through the cooling conduit and into the manifold of the burner head 80, which may be similar in construction to that disclosed in the aforementioned copending application. Two rows of nozzles 101 project from said burner head and are angularly disposed with respect to each other as well as to the glass sheets so as to direct the flames therefrom to the marginal edges of the sheets, in a manner more particularly described in said copending application. The cooling medium, on the other hand, enters the burner head, cools the manifold, and leaves the head through pipe 102 from whence it is carried by hose 103 to a suitable place for disposal. Said pipe is retained in operative relation with respect to the cooling conduit by means of a clamp 104 at a point outwardly of the burner head.

In this connection and with particular reference to Fig. 16, as the sheets are moved past the burner head, the flames from the upper row of nozzles of said head are directed toward the marginal edges of the larger upper sheet 21. Simultaneously, the flames of the lower row are directed toward the marginal edges of the smaller lower sheet 22. It has been found that when the flames are so directed and the burner heads 80 are properly adjusted vertically and horizontally with respect to the edges, the edges can be brought to a temperature such that they will be fused almost instantaneously. That is, as they are moved past the head, the marginal edges of the upper sheet will fold downwardly and those of the lower will curl upwardly, such that side portion 23 is formed thereby as said edges unite and are fused.

As noted above, the fusion of the edges takes place almost instantaneously as the sheets pass the burner heads making necessary, of course, the "knocking-out" of supporting arms 37 in order that the marginal edges of the upper sheet 21 may fold or sag freely so as to fuse with the edges of the lower sheet in the manner described. At the same time, however, to retain the proper spaced face-to-face relationship therebetween, the sheets must be supported until just prior to fusion. A simple but no less novel means is provided within and longitudinally of the furnace for swinging or removing the T-shaped upper sheet supporting arms to the "knocked-out," non-supporting position just prior to the time at which that portion of the upper sheet supported by the arms passes the burner heads 80. It has been found that after fusion does occur the side portions 23 formed thereby are adequate to support that portion of the upper sheet which has passed the burner heads and from under which arms 37 have been "knocked-out." In other words, the upper sheet is at no time during the fusing operation without adequate support.

This "knock-out" means consists of upstanding posts 105 rigidly secured to the bottom wall 72 of the furnace by suitable means, such as the anchor bolts shown in Fig. 16, and positioned on each side of the path of carriage 25 just forwardly or to the left of both of the sealing areas (Fig. 7). As clearly illustrated in Fig. 16, said posts are spaced slightly outwardly from the path of flanges 36 of carriage tray 35 but directly in the path of handles 40 on the upper sheet supporting arms. Thus with the carriage moving forwardly, arms 37 would be progressively "knocked-out" simultaneously at both sides of the carriage, as they make contact with said posts 105, and would assume the non-supporting position shown in Fig. 16 as well as by the broken lines of Fig. 10.

After the supporting arms have been "knocked-out" on one pair of opposite sides and the marginal edges of said sides have been fused, the glass sheets are indexed, in a manner to be subsequently described in detail, and the supporting arms from the other pair of opposite sides are similarly "knocked-out." That is, intermediate of the sealing areas and the "knocking-out" of the supporting arms for first one and then the other of the opposite sides of the sheets, the sheets as well as the tray supporting them are indexed or turned 90 degrees while the carriage 25 itself maintains its straight and continuous path forwardly through the length of the furnace. The marginal edges of said other sides are then fused, at which time, of course, the sheets are fused entirely around their marginal edges and are moved into the annealing area E. As can be readily understood, this indexing is necessary in order that the supporting arms have all four marginal edges of the upper sheet "knocked-out" preparatory to their fusing with the corresponding marginal edges of the lower sheet and during movement of the carriage continuously in a straight path.

It will be understood that after the sheets have completely passed the first sealing area B, the first pair of opposite side edges of the sheets have been fused. At a point then to the right of or beyond the first sealing area and at a distance longitudinally from the first set of burner heads 80 slightly greater than the length of the sheet edges just fused, there is provided an indexing device 106 (Fig. 14) which, acting in cooperation with sector gear 44 of the sheet supporting carriage 25, serves to index or turn the tray 35 and the sheets supported thereon 90 degrees in the plane of said sheets prior to their entry into the second sealing area D, such that the unsealed opposite side edges will be disposed toward the burner heads of the second sealing area when moved therepast.

Indexing device 106 comprises a base plate 107 secured to and supported on transverse supporting members 108 and 109, which are in turn supported by upstanding frame members 30 and inverted U-shaped T rail supports 89, respectively, adjacent and beneath rails 27 (Fig. 7). The bottom flange of a stepped channel-like member 110 is bolted to plate 107 through longitudinally extending slots 111, thus permitting said stepped member to be moved longitudinally of rails 27. As shown in Fig. 15, the base plate 107 and stepped member 110 are spaced to one side of said rails 27 and wheels 52 of the carriage 25. Also, the stepped member is of a height such that a toothed rack 112 secured to the upper flange of said member and projecting inwardly therefrom will engage the teeth of sector gear 44 as the carriage reaches the indexing area C (Fig. 14).

It can now be seen that as the carriage moves through the indexing area, the teeth of the sector gear will mesh with those of rack 111 such that the gear will be indexed or turned 90 degrees counterclockwise, along with the tray 35 and sheets 21 and 22 supported thereon, at the completion of which arm 49 will abut against limit screw 50 shown in broken lines of Fig. 14, and the carriage 25 will then be moved toward the second sealing area D. Thus, shortly before the second sealing area is reached, the unsealed opposite pair of side edges of sheets 21 and 22 and the supporting arms 37 for the unsealed marginal edges of the upper sheet are indexed to a position parallel to the furnace and path of the carriage, at which time said arms are in position to be "knocked-out" or removed to the non-supporting position and the marginal edges of the unsealed sides are in position to be fused as were there adjacent edges at the first sealing area.

Viewing then the operation of this apparatus as a whole and with particular reference to the novel sheet supporting and indexing devices embodied therein, carriage 25 is moved to its initial position to the left of the furnace and lower sheet 22 is placed on tray 35 of the carriage after which arms 37 are swung into the glass supporting position and upper sheet 21 is placed on said arms such that it is supported at all four sides in spaced face-to-face and substantially vertically aligned relation with respect to the lower sheet. Prior to the placing of the lower sheet thereon the rim of the tray may be coated with colloidal graphite or the like to make it non-adherent with the edge of the sheet during fusing thereof with the upper sheet. Rod 60 is then tilted such that key 61 engages with link chain 62 moving toward the furnace 26, and gate 74 is lifted as the carriage moves into the preheating area A.

As the carriage leaves the preheating area and just prior to its entering the first sealing area B, the arms 37 forwardly of tray 35, supporting the edges of the upper sheet facing the burner heads 80 and parallel to the path of travel of the carriage, are progressively "knocked-out" by upstanding posts 105. Immediately following the removing of each of the arms to the non-supporting position, the portions of the upper sheet edges previously supported thereby and disposed towards the burners are fused with the corresponding edge portions of the lower sheet as they pass burner heads 80 in the first sealing area. Thus, in this manner, the entire lengths of the aforementioned edges are progressively fused while being continuously maintained in fixed spaced relation as the carriage moves its full length past the burner heads, which, of course, have been adjusted by the apparatus disclosed herein in order to obtain the optimum fusion between the sheets in a manner previously described.

As they leave the first sealing area B, the upper sheet 21 is supported above the lower sheet 22 on two sides by arms 37 and on the other adjacent sides by the fused portions 23 between said sheets. At this time, sector gear 44 is engaged with rack 111 at the indexing area C and the tray and sheets supported thereby are indexed 90 degrees such that the edges of the upper sheet which have been fused with those of the lower are disposed perpendicular to the path of the carriage, and the adjacent, arm supported and unfused upper sheet edges are disposed parallel to said path so as to face the burner heads of the second sealing area D.

Thus, shortly after having been indexed and disposed as above noted, the sheets and tray enter the second sealing area and the arms 37 supporting the unfused edges of the upper sheet are progressively "knocked-out" and the marginal edges of the upper and lower sheets progressively fused as they pass the second set of burner heads 80, in a manner similar to that described with respect to the first sealing area. Thus, as the carriage leaves the second sealing area the sheets have been fused together entirely around their marginal edges to form side portions 23 at all four sides and are held rigidly in spaced face-to-face relation solely by said portions. After the carriage is moved through the annealing area E, the gate at the end of the furnace is raised and the carriage emerges from the furnace at which time the key 61 of rod 60 may be disengaged from link chain 62. Marginally sealed glazing unit 20 may at this time be removed from the tray 35, and, by means of hole 24, may be dehydrated and hermetically sealed in any suitable manner so as to form an hermetically sealed composite structure.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. In apparatus for fusing spaced sheets of glass entirely around the marginal edges thereof, a carriage movable in a straight path, a sheet supporting tray means for supporting said tray above said carriage for rotative movement with respect thereto in the plane of said path, indexing means along said path and engageable with cooperating means on the tray supporting means during movement of said carriage past said indexing means for pivotally moving said tray a predetermined amount in the plane of the path, stops on said carriage, and means on said tray supporting means adapted to engage with said stops at the completion of said predetermined pivotal movement.

2. In apparatus for fusing spaced sheets of glass entirely around the marginal edges thereof, a carriage for continuously moving said sheets in a straight line, means on said carriage for supporting a lower sheet, means on said carriage for supporting each edge of an upper sheet in spaced relation with respect to those of said lower sheet, said supporting means being rotatably mounted as a unit on said carriage to permit indexing, means for moving said second named supporting means for at least one edge in the plane of said sheets to a non-supporting position during said continuous movement and prior to the fusing of said edge with its corresponding lower sheet edge, and means for indexing the supports for said sheets subsequent to said fusing.

3. In apparatus for fusing spaced sheets of glass entirely around the marginal edges thereof, a carriage for continuously moving said sheets in a straight path, means on said carriage for supporting a lower sheet, means on said carriage for supporting each edge of an upper sheet in spaced relation with respect to those of said lower sheet, said supporting means being rotatably mounted as a unit on said carriage to permit indexing means for moving said second mentioned supporting means for opposite edges to a non-supporting position prior to the fusing of said opposite edges with their corresponding lower sheet edges, and means for indexing the supports for said sheets relative to said path subsequent to said fusing and during said continuous movement such that opposite unfused edges are in position to be fused.

4. In apparatus for fusing spaced sheets of glass entirely around the marginal edges thereof, a carriage for continuously moving said sheets in a straight path past burners for fusing together the edges thereof as they move therepast, means on said carriage for supporting a lower sheet means on said carriage for supporting each edge of an upper sheet in spaced relation with respect to those of said lower sheet, said supporting means being rotatably mounted as a unit on said carriage to permit indexing means forwardly of said burners for moving said second mentioned supporting means for opposite edges in the plane of said sheets to a non-supporting position during said continuous movement and prior to the fusing thereof by said burners with their corresponding lower sheet edges, and means beyond said burners for indexing the supports for said sheets relative to said path subsequent to said fusing and during said continuous movement such that opposite unfused edges are in position to be fused.

5. In apparatus for fusing spaced sheets of glass entirely around the marginal edges thereof, a carriage for continuously moving said sheets in a straight path, means on said carriage for supporting a lower sheet means on said carriage for supporting each edge of an upper sheet in spaced relation with respect to those of said lower sheet, said supporting means being rotatably mounted as a unit on said carriage to permit indexing means for moving said second supporting means for opposite edges in the plane of said sheets to a non-supporting position prior to the fusing of said opposite edges with their corresponding lower sheet edges, and means along said path adapted to cooperate with said carriage for indexing the supports for said sheets relative to said path subsequent to said fusing and during said continuous movement such that opposite unfused edges are in position to be fused.

6. In apparatus for fusing spaced sheets of glass entirely around the marginal edges thereof, a carriage for continuously moving said sheets in a straight path past burners for fusing the edges as they move therepast, means on said carriage for supporting a lower sheet, means on said carriage for supporting each edge of an upper sheet in spaced relation with respect to those of said lower sheet, said supporting means being rotatably mounted as a unit on said carriage to permit indexing means along said path forwardly of said burners for moving said second mentioned supporting means for opposite edges to a nonsupporting position during said continuous movement and prior to the fusing thereof by said burners with their corresponding lower sheet edges, and means along said path beyond said burners and adapted to cooperate with said carriage for indexing the supports for said sheets relative to said path subsequent to said fusing and during said continuous movement such that opposite unfused edges are in position to be fused.

7. In apparatus for fusing spaced sheets of glass entirely around the marginal edges thereof, a carriage for continously moving said sheets in a straight path between longitudinally spaced sets of burners for almost instantaneously fusing said edges as they move therepast, means on said carriage for supporting a lower sheet, means on said carriage for supporting each edge of an upper sheet in spaced and approximately vertically aligned relation with respect to those of said lower sheet, said supporting means being rotatably mounted as a unit on said carriage to permit indexing means forwardly of the first set of burners for moving said second mentioned supporting means for a first pair of opposite edges and forwardly of the second set for similarly moving said supporting means for a second pair of opposite edges in the plane of said sheets to a non-supporting position prior to the fusing thereof by said burners with their corresponding and approximately aligned lower sheet edges, and means intermediate of said first and second set of burners for indexing the supports for said sheets relative to said path subsequent to the fusing of the first pair of opposite edges and prior to the fusing of the second pair of opposite edges with their respective corresponding lower sheet edges such that said second pair are disposed in proper operative relationship for said fusing with respect to said second set of burners.

8. In apparatus for fusing spaced sheets of glass entirely around the marginal edges thereof, means for supporting a glass sheet in spaced face-to-face relation with respect to another sheet for movement along a definite path, means mounting said supporting means for rotation, means connected to said supporting means for rotating said supporting means, means for moving said supporting means and mounting means therefor along a definite path, and means disposed along said path adapted to cooperate with said means for rotating the supporting means for indexing the said supporting means and glass sheets during said movement.

References Cited in the file of this patent
UNITED STATES PATENTS

| | | |
|---|---|---|
| 2,194,755 | Kel | Mar. 26, 1940 |
| 2,389,360 | Guyer et al. | Nov. 20, 1945 |
| 2,624,979 | Clever et al. | Jan. 13, 1953 |